Sept. 22, 1953          E. C. BALLMAN          2,652,997

RESILIENT MOUNTING FOR ELECTRIC MOTORS

Filed Feb. 24, 1948          2 Sheets-Sheet 1

INVENTOR:
EDWIN C. BALLMAN
BY
ATTORNEYS.

Sept. 22, 1953  E. C. BALLMAN  2,652,997
RESILIENT MOUNTING FOR ELECTRIC MOTORS
Filed Feb. 24, 1948  2 Sheets-Sheet 2

INVENTOR:
EDWIN C. BALLMAN
BY Brumiga & Sutherland
ATTORNEYS.

Patented Sept. 22, 1953

2,652,997

UNITED STATES PATENT OFFICE 2,652,997

RESILIENT MOUNTING FOR ELECTRIC MOTORS

Edwin C. Ballman, University City, Mo., assignor to Ballman Engineering Company, St. Louis, Mo., a corporation of Missouri Application February 24, 1948, Serial No. 10,203

2 Claims. (Cl. 248—26)

This invention pertains to resilient mountings, more particularly for electric motors.

Alternating-current motors, particularly single-phase motors, produce a pulsating torque which varies at double the line frequency. This tends to set up high-frequency vibrations which, if not suppressed, may be communicated to the motor supports in such a way as to produce an objectionable noise. In order to overcome this effect, resort has been had to resilient mountings for the motor arranged to permit angular vibration about the motor axis without transmitting the same to the supports.

One of the objects of this invention is to provide an improved resilient mounting of this type, which will be simple in construction and cheap to manufacture.

Further objects will appear from the following description, taken in connection with the accompanying drawing, in which will be set forth an illustrative embodiment of this invention. It is to be understood, however, that this invention is susceptible of various embodiments, within the scope of the appended claims, without departing from the principles or spirit of the invention.

In the accompanying drawing.

Figure 2:
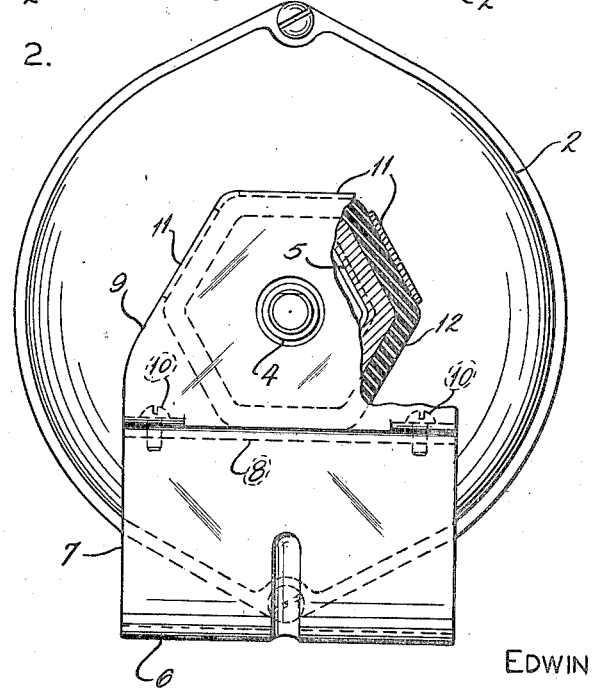
Figure 2 is a right-hand end view of Figure 1.

Referring to the drawing, the motor to be mounted may comprise a stator 1 having end plates 2, and a rotor 3 having a shaft 4. In accordance with this invention, each end plate 2 is provided with a mounting element in the form of a boss or lug 5, surrounding the bearing and projecting outward from the end plate. This boss is non-circular in end view, being hexagonal in the embodiment illustrated as shown in Figures 2 and 4.

The motor support may be in the form of a base 6 having upright end standards 7. This base may be made of heavy sheet metal, and the top of the standard 7 may be bent inward to provide an upper supporting face 8 which, in the embodiment shown, is horizontal. A mounting member 9 is detachably secured to the standard 7 by screws 10, or other suitable fastening means. The member 9 may be formed of sheet metal, with wings 11 bent up to provide angularly-arranged locating elements. In Figure 2 these wings are aranged to form three sides of a hexagon, matching that of the lug 5, but spaced therefrom.

Figure 1:
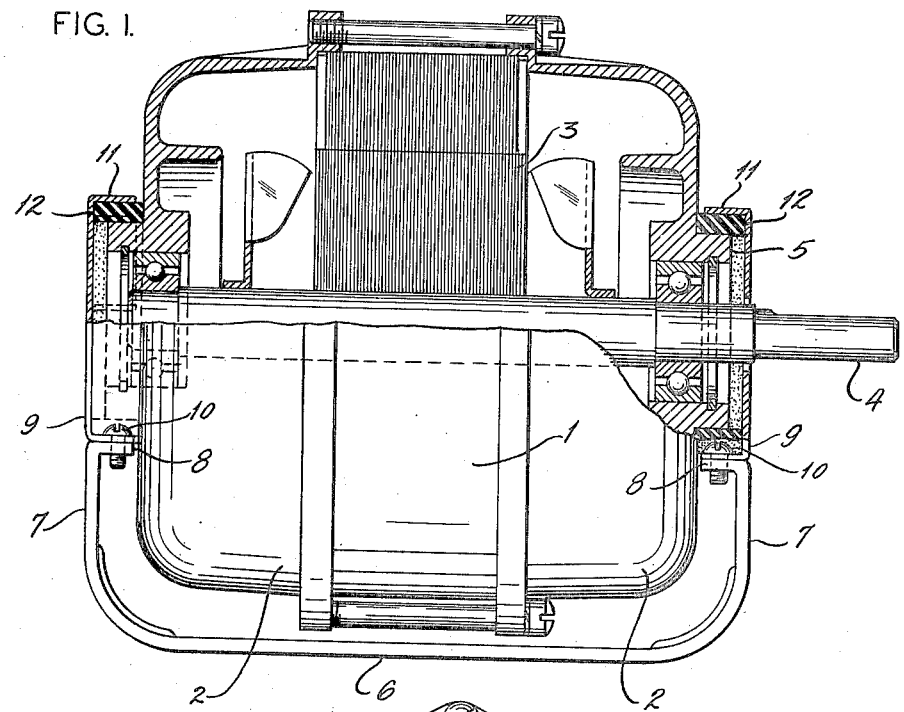
Figure 1 is a side elevation, partly in section, of a motor provided with a mounting embodying this invention.

A cushioning element 12, of substantially uniform cross-section, is arranged to embrace the lug 5 and occupy the spaces between the faces of the lug 5 and those of the wings of the mounting member 9. In Figure 2 the upper face 8 of the standard 7 forms one side of the enclosing hexagon. The cushioning element 12 may be of rubber or other suitable resilient material, such as certain plastics. It is preferably made up in the simplest possible form, such as a plain circular ring. Thus it may be made by cutting sections from a suitable size of tubing or hose. However, any other simple form may be used, such as a straight strip of cushioning material wrapped about the lug 5. Being easily distortable, it is stretched slightly or bent to fit it over the lug 5, to form a resilient cushion embracing said lug. It is then fitted into the outer polygon formed by the wings 11 and the face 8. The element 12 may be of greater axial dimension than either the lug 5 or the wings 11, as shown in Figures 1 and 3, so as to provide resilience against endwise movement as well as against lateral or rotary movement.

Figure 3:
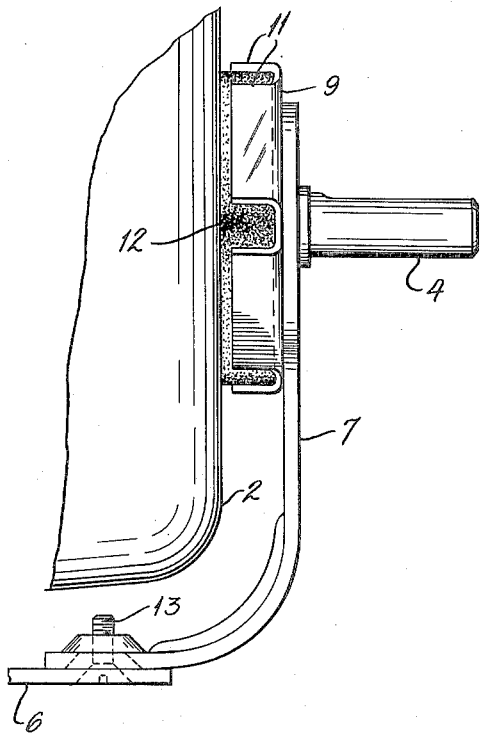
Figure 3 is a fragmentary side elevation illustrating another embodiment of this invention.
Figure 4:
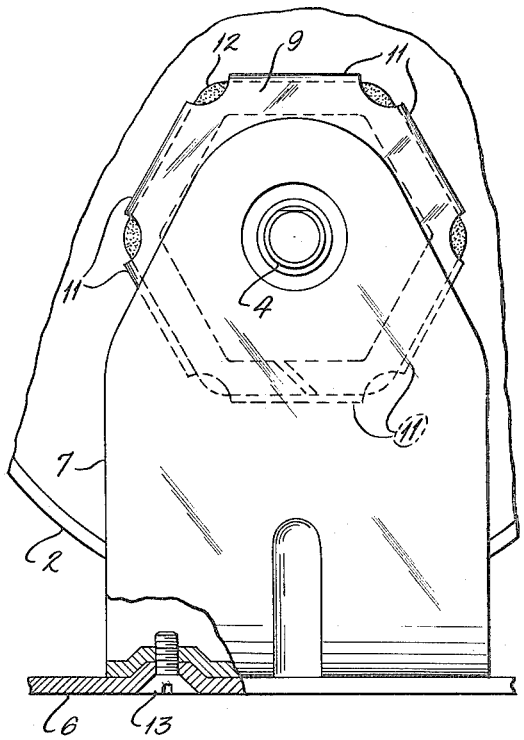
Figure 4 is a right-hand end view of Figure 3.

In the embodiment of Figures 3 and 4, the standards 7 are separate from the base 6, and secured thereto by screws 13, or other suitable fastenings; and the member 9 is formed with the wings 11 forming a complete hexagon. The member 9 may be secured to the standard 7 by welding or otherwise.

Figure 5:
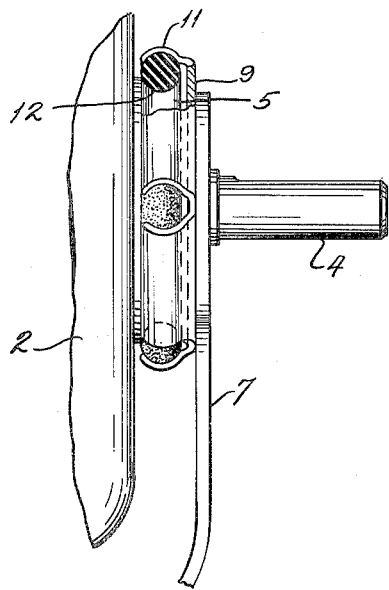
Figures 5 and 6 are views, similar respectively to Figures 3 and 4, illustrating still another embodiment of this invention.
Figure 6:
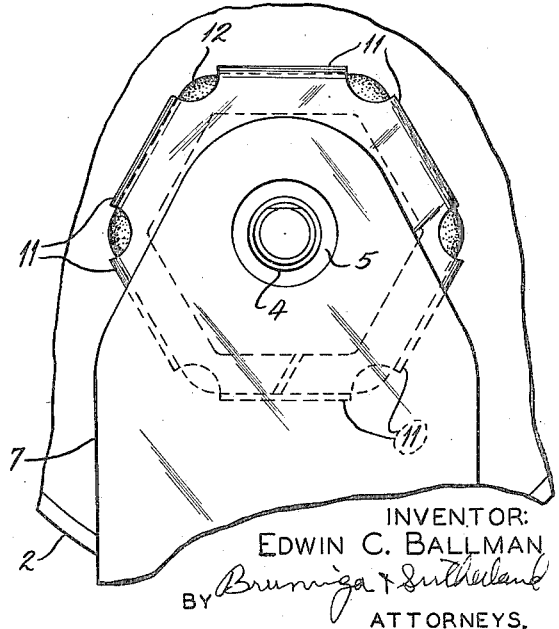

In the embodiment of Figures 5 and 6 the cushioning element 12 has a circular cross section and the wings 11 and the lug 5 are channeled to fit the same, and provide a seat therefor. Here again the element 12 may be a complete ring or simply a straight strip bent around the lug 5. This mounting may be assembled by forcing the wings 11 over the element 12 while the latter embraces the lug 5, taking advantage of the resiliency of both the wings and the cushioning element. The assembly is then self-alining in the endwise direction. This arrangement may be used on one end of the motor only in order to establish or to preserve such alinement, as when the other end must be dismounted for service operations or the like.

It will be seen, therefore, that this invention provides a simple and effective mounting of the character desired. The polygonal lug 5 is easily formed on the end plate when cast, and adds practically nothing to the cost thereof. The supporting base 6—7 may be cheaply made by well known sheet-metal forming operations. The cushioning element 12, in its relaxed condition, may be of one of the simplest conventional shapes, such as a circle, or a straight strip, so that its manufacture is simple and its cost low. Then, by re-shaping, it is mounted in its position in the assembly. The hexagonal form of the mounting elements is simple and easily adapted to known forming operations, though other forms may be used. In the embodiment of Figures 1 and 2, though only four sides of the hexagon are used, the arrangement is such as to accurately locate the motor axis both vertically and horizontally, since the element 12 is of uniform thickness.

Having thus described the invention, what is claimed is:

1. A mounting of the character described comprising a support member having an upright standard with an upper supporting face; a mounted member having a polygonal mounting element; a mounting element on said support member, the mounting element of the support member being formed of sheet metal provided with separated wings, said mounting elements being arranged in generally concentric relation to each other, said wings extending along and spaced from sides of the polygonal mounting element of the mounted member; and a cushioning element of rubber-like resilient material of substantially uniform cross-section mounted between said elements, said cushioning element having a greater axial extent than either of said mounting elements, the mounting element of said support member being removably secured to said standard at said upper face.

2. A mounting of the character described comprising a support member having an upright standard; a mounted member having a polygonal mounting element; a mounting element on said support member, the mounting element of the support member being formed of sheet metal provided with separated wings, said mounting elements being arranged in generally concentric relation to each other, said wings extending along and spaced from sides of the polygonal mounting element of the mounted member; and a cushioning element of rubber-like resilient material of substantially uniform cross-section mounted between said elements.

EDWIN C. BALLMAN.

References Cited in the file of this patent

UNITED STATES PATENTS

| Number | Name | Date |
|---|---|---|
| 1,971,417 | Kingston et al. | Aug. 28, 1934 |
| 2,012,688 | Leland | Aug. 27, 1935 |
| 2,042,666 | Kunkle | June 2, 1936 |
| 2,089,066 | Morrill | Aug. 3, 1937 |